(12) United States Patent
Willim

(10) Patent No.: US 10,005,646 B2
(45) Date of Patent: Jun. 26, 2018

(54) BOOM ELEMENT, TELESCOPIC BOOM, PINNING SYSTEM AND CONSTRUCTION VEHICLE

(75) Inventor: Hans-Dieter Willim, Ulm-Unterweiler (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 813 days.

(21) Appl. No.: 13/268,003

(22) Filed: Oct. 7, 2011

(65) Prior Publication Data

US 2012/0085722 A1    Apr. 12, 2012

(30) Foreign Application Priority Data

Oct. 8, 2010  (DE) .......................... 2020 1 0014105

(51) Int. Cl.
*B66C 23/70*        (2006.01)

(52) U.S. Cl.
CPC .......... *B66C 23/708* (2013.01); *B66C 23/707* (2013.01); *Y02B 10/30* (2013.01)

(58) Field of Classification Search
CPC ... B66C 23/701; B66C 23/705; B66C 23/708; B66C 23/04; B66C 23/30; B66C 23/305; B66C 23/346; B66C 23/342; B66C 23/707; B66C 23/286
USPC .......................... 212/292, 299, 347, 348, 349
See application file for complete search history.

(56) References Cited

U.S. PATENT DOCUMENTS

| | | | | |
|---|---|---|---|---|
| 4,036,372 A | * | 7/1977 | Rao et al. ..................... | 212/230 |
| 5,829,606 A | * | 11/1998 | Erdmann ....................... | 212/350 |
| 5,865,328 A | * | 2/1999 | Kaspar .......................... | 212/350 |
| 6,527,131 B1 | * | 3/2003 | Brockelmann et al. ...... | 212/292 |

FOREIGN PATENT DOCUMENTS

| | | |
|---|---|---|
| DE | 10007773 | 12/2000 |
| DE | 20014056 | 1/2002 |
| EP | 849212 | 6/1998 |

OTHER PUBLICATIONS

Translation of DE 20014056 U1.*

* cited by examiner

*Primary Examiner* — William E Dondero
*Assistant Examiner* — Nathaniel L Adams
(74) *Attorney, Agent, or Firm* — Dilworth & Barrese, LLP

(57) ABSTRACT

The present invention relates to a boom element for a telescopic boom, in particular a telescopic section or a pivotal piece of a telescopic boom, wherein the boom element has a substantially box-shaped hollow structure and wherein at least one component of a pinning system is arranged in at least one of the corner edges of the box-shaped hollow structure, wherein at least one further boom element located in the boom element and/or about the boom element can be pinned to the boom element by means of the pinning system for the purpose of fixing, and wherein the component of the pinning system is and/or includes at least one pin mount and/or at least one pin guide in which the at least one pin is guided and/or movable.

17 Claims, 15 Drawing Sheets

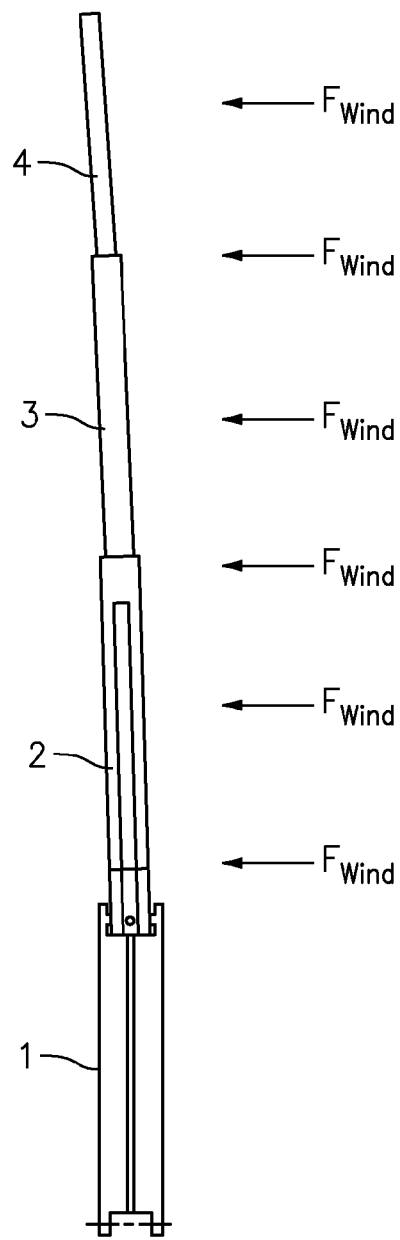
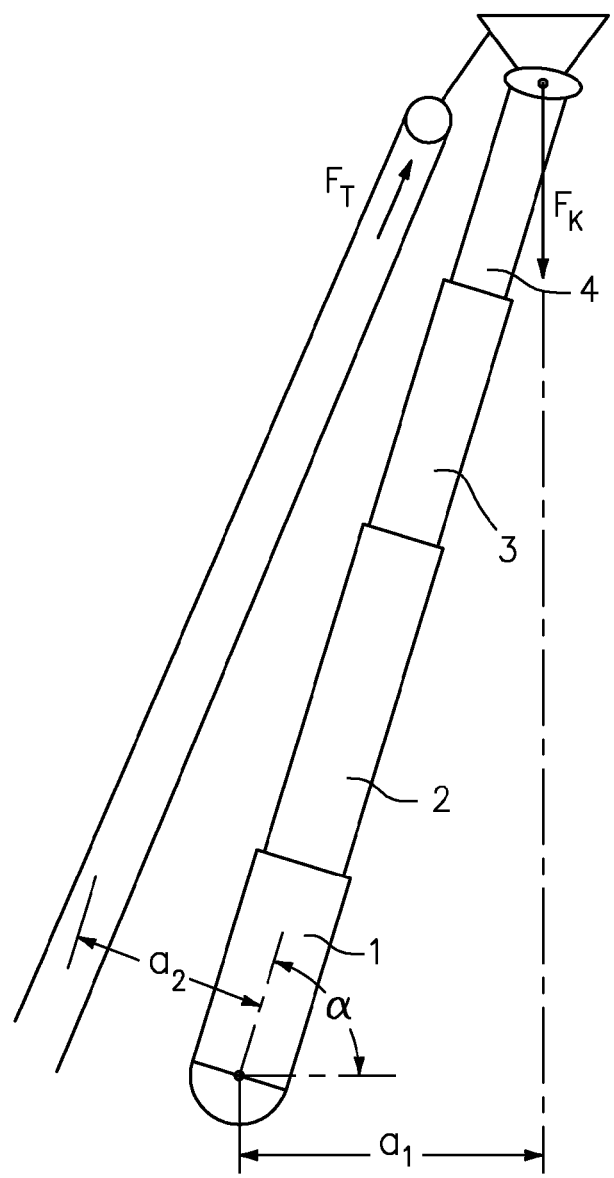
FIG. 23
FIG. 24

BOOM ELEMENT, TELESCOPIC BOOM, PINNING SYSTEM AND CONSTRUCTION VEHICLE

BACKGROUND OF THE INVENTION

The present invention relates to a boom element for a telescopic boom, in particular to a telescopic section or to a pivotal connection piece of a telescopic boom, to a telescopic boom, to a pinning system and to a construction vehicle.

In wind power plants, very large hub heights are in the meantime being sought for the wind turbines to obtain a wind power on the rotor blades which is as homogenous as possible. In the assembly of wind power plants, the maximum achievable hub height therefore represents a characteristic value for the required hoisting units, usually mobile cranes having telescopic booms.

Starting from the demand of providing very large boom systems with a large boom length, the problem has occurred that customary telescopic booms have become too heavy. Telescopic booms, however, have the advantage over booms made from customary lattice elements that they can be switched fast from a transport state to a working state and take up substantially less room in the assembly. A further substantial advantage comprises the fact that, with the usually used lattice mast cranes, derrick booms are required for erecting the boom using corresponding derrick ballast for the assembly of the wind power plants with the large boom lengths.

Furthermore, when a crane having a lattice boom is moved on a construction site in the erected state, i.e. should change its location, the total center of gravity of the crane is very high. If the lattice boom could be telescoped inward, it would not be necessary to set up the boom with a very steep angle to achieve a required security with respect to the risk of tipping over. A lower center of gravity could namely be achieved by the telescoping inward, which has very great advantages with respect to the risk of tipping over.

A telescopic boom having telescopic sections is already known from DE 200 14 056 U1 in which the corner sections of the telescopic section are connected to one another by means of lattice bars arranged in a half-timbered manner and by means of connection plates.

Furthermore, a multi-section telescopic system is known from EP 0 754 646 A1 in which the telescopic sections can be pinned for the purpose of locking by means of a pinning system.

SUMMARY OF THE INVENTION

It is therefore the object of the present invention to further develop a boom element of the initially named kind in an advantageous manner, in particular such that, in addition to the required stability, it simultaneously has an acceptable weight for achieving a lifting height which is as high as possible and furthermore such that a secure pinning of a telescopic boom comprising telescopic boom elements can be made possible.

This object is achieved in accordance with the invention by a boom element for a telescopic boom having the features herein. Provision is accordingly made that a boom element for a telescopic boom has a substantially box-shaped hollow structure, with at least one component of a pinning system being arranged in at least one of the corner edges of the box-shaped hollow structure, with at least one further boom elements located in the boom element and/or around the boom element being able to be pinned to the boom element by means of the pinning system for purposes of fixing and with the component of the pinning system being and/or comprising at least one pin mount and/or at least one pin guide in which the at least one pin is guided and/or movable.

The boom element can in particular be a telescopic section or a pivotal connection piece of a telescopic boom, that is the part of the telescopic boom in which the further boom elements, namely the further telescopic sections, are received in a telescopic manner.

The advantage results by the arrangement of the pinning system in the corner edges of being able to provide a solution for a pinning of boom elements for a telescopic boom which is favorable with respect to load and is simultaneously space saving. A secure and reliable pinning can in particular be provided for the desired high lifting heights and the correspondingly large or long boom elements.

Provision can furthermore be made that the pinning system has at least one pin spring-loaded by a spring, with the spring preferably being a restoring spring and with the pin having to be retracted against the spring force by means of an actuation unit to release the pin connection.

It is preferably conceivable that the actuation unit is arranged in the interior of a boom element. The space present in the interior of the hollow structure of the boom elements can thereby be ideally utilized and a compact structure, which is hereby also weight-optimized, can be provided.

The pin can advantageously be inwardly retractable with respect to the boom element or provision can be made in an alternative embodiment that the pin can be pushed outwardly with respect to the boom element.

It is moreover possible that the boom element has shell-shaped corner beams which form the corner edges of the box-shaped structure and has lattice bars and with the shell-shaped corner beams being connected to one another by means of the lattice bars.

A stable, loadable and simultaneously comparatively light structure can advantageously be provided by the connection of the corner beams each forming the outer edges of the box-shaped hollow structure to the lattice bars. High or big lifting heights can thus be easily realized without simultaneously having to accept an unacceptable weight increase.

Provision can advantageously be made that the lattice bars are arranged in a half-timbered manner at a right angle to the corner beams and/or at an angle, differing from a right angle, in particular an acute or an obtuse angle, to the corner beams.

It is generally conceivable that connection plates are used beside the lattice bars connecting the corner beams so that the box-shaped hollow structure has closed outer walls at least sectionally and not only the lattice bars arranged in a half-timbered manner at the side surfaces of the hollow structure. This is, however, not absolutely necessary, but can be desired to cover components such as actuation elements of the telescopic cylinder in the retracted and extended state.

It is further possible that a pinning system is arranged in at least three, preferably four, corner beams and/or that at least one respective pin mount is provided in a first position and in at least one second position, with the first position corresponding to a retracted position and the second position corresponding to an extended position. It is generally also conceivable to provide three or more positions, for example a first position for the retracted or inwardly telescoped state, a position for the completely outwardly telescoped state and one or more intermediate positions between the first and second positions. It is conceivable in this connection to provide corresponding support points in connection with the respective positions.

Provision can furthermore be made that the axis of the pin of the pinning system is aligned and/or arranged substantially along the angle bisector between the limbs of a corner beam and is further preferably arranged in a plane perpendicular to the longitudinal axis of the boom element and/or that a guide tube and/or holding tube is inserted into the corner beam and the pin of the pinning system is guided therein.

It is further conceivable that at least one means for the exact positioning of the boom element is provided by means of which the boom element can be indirectly and/or directly positioned, with the means for the exact positioning preferably being a compulsory positioning means, with the compulsory positioning means, for example, having an abutment by means of which a spacer can be positioned in a compulsory manner in a predefined position on reaching the end position and/or with the compulsory positioning means, for example, having at least one centering spigot by means of which a front or first support point of the boom element can be positioned in a predefined position in a compulsory manner with the spacer.

The present invention furthermore relates to a telescopic boom having the features herein. Provision is accordingly made that a telescopic boom is provided with at least one boom element in accordance with the features herein.

It is further advantageously conceivable that the telescopic boom has at least one first boom element and at least one second boom element, with them respectively being boom elements in accordance with the features herein and with the second boom element surrounding the first boom element or with the first boom element surrounding the second boom element, with the pin guide and the actuation unit for the pin being arranged at and/or in the first boom element and with the pin mount being arranged at and/or in the second boom element and with the first and second boom elements being able to be pinned in that the pin of the pinning system engages into the pin mount in the second boom element.

It is possible that the first or second boom elements can be extended from the retracted state when all the pinning systems associated with the first and/or second boom elements are retracted from the respective pin mount in the first position of the first or second boom elements.

Provision can furthermore be made that the first and second boom elements can be pinned in the extended state when the pinning systems associated with the first and/or second boom elements engage in a pinning manner in the respective pin mounts in the second position after release by the actuation unit.

It is further possible that the first or second boom elements can be retracted from the extended state when all the pinning systems associated with the first and/or second boom elements are retracted from the respective pin mount in the second position of the first or second boom elements.

It is furthermore conceivable that the first and second boom elements can be pinned in the retracted state when the pinning systems associated with the first and/or second boom elements engage in a pinning manner in the respective pin mounts in the first position after release by the actuation unit.

In addition, the present invention relates to a pinning system having the features of claim 10. Provision is accordingly made that a pinning system is formed, in particular for a boom element in accordance with claims 1 to 6 and/or for a telescopic boom in accordance with one of the claims 7 to 9, having the features of the pinning system in accordance with one of the preceding claims.

Provision is in particular made that the pinning system has at least one pin spring-loaded by a spring, with the spring preferably being a restoring spring and with the pin having to be retracted against the spring force by means of an actuation unit to release the pin connection.

Provision can furthermore in particular be made that such a pinning system has at least connection means by means of which it can be connected and/or fastened to a boom element in accordance with claims 1 to 6 and/or to a telescopic boom in accordance with one of the claims 7 to 9. It is preferably possible by means of the connection means to insert the pinning system in an exact fit e.g. into the boom element or into the corner beam or into the corner edge of a boom element and to fasten it there. It is for example possible by means of the at least one connection means that the axis of the pin of the pinning system is aligned and/or arranged substantially along the angle bisector between the limbs of a corner beam and is further preferably arranged in a plane perpendicular to the longitudinal axis of the boom element and/or that a guide tube and/or holding tube is inserted into the corner beam and the pin of the pinning system is guided therein. The connection means can, for example, have fitting surfaces or comparable fitting portions.

The present invention furthermore relates to a construction vehicle having the features herein. Provision is accordingly made that a construction vehicle, in particular a mobile crane having a telescopic boom is provided with at least one boom element and/or with at least one telescopic boom and/or with at least one pinning system in accordance with the features herein.

BRIEF DESCRIPTION OF THE DRAWINGS

Further details and advantages of the invention will now be explained in more detail with reference to an embodiment shown in the drawing.

There are shown:

FIG. 23: a schematic representation of the telescopic boom on being exposed to wind forces;

FIG. 24: a schematic representation of the telescopic boom in the extended state;

DESCRIPTION OF THE PREFERRED EMBODIMENTS

Figure 1:
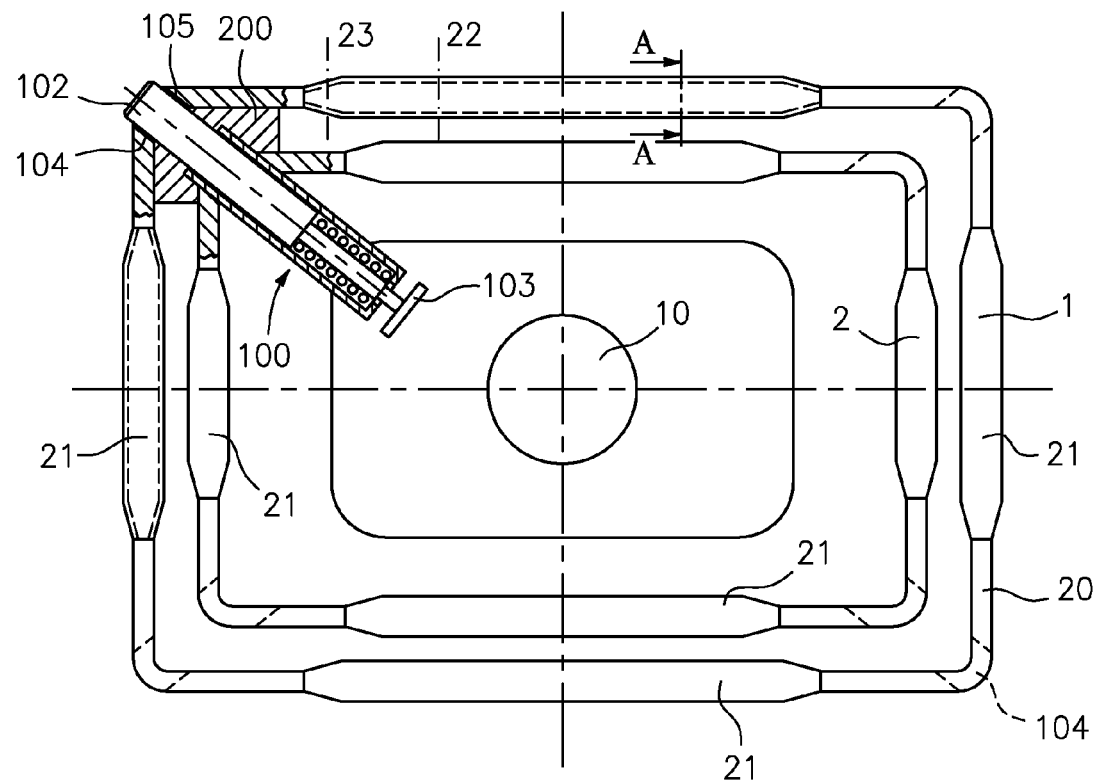
FIG. 1: a schematic front view of a telescopic boom.

FIG. 1 shows a schematic front view of a part of the telescopic boom in accordance with the invention, with here two telescopic sections 1 and 2 being shown. As can be seen from FIG. 1, shell-shaped corner beams 20 are used in each telescopic section 1, 2, 3, 4.

The corner beams 20 can be edged, bent or be manufactured from tubular sections or even as an extruded section. The corner beams 20 are connected via lattice bars 21 which are arranged at a right angle to the corner beams 20, called zero bars, or/and also at a different angle to the corner beams 20, called diagonals.

Figure 2:
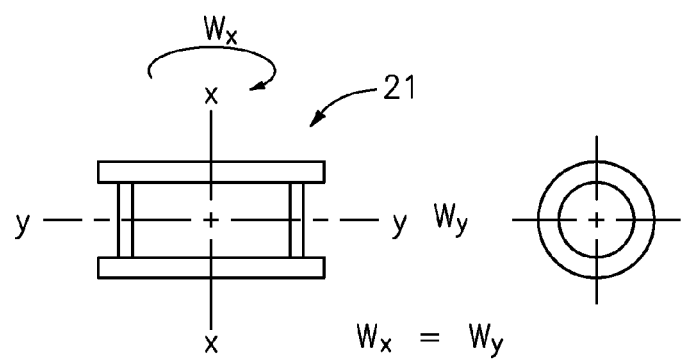
FIG. 2: a section A-A through the telescopic boom shown in FIG. 1.

Each lattice bar 21 can also be manufactured from a weld construction of four metal sheets as is shown in FIG. 2. FIG. 2 shows the section A-A from FIG. 1. The resistance torque $W_x$ about the X axis x and the resistance torque $W_y$ about the Y axis y is of equal magnitude and corresponds to that of a circular tube cross-section. A tubular lattice bar 21 is thus simulated and nevertheless the "flat" construction shape achieved. The wall thicknesses are optimized with respect to the possible kinking.

Each telescopic section 1, 2, 3 and 4 (cf. also FIG. 23) has cut-outs 104 in the shell-shaped corner beams 20 and the inner telescopic section 2, 3 and 4 can be pinned in said cut-outs. The pinning system is marked by 100 in FIG. 1. To simplify the pairing of pin 102 and recess 104, an elongate hole 105 can be laterally provided. The elongate hole is thus aligned perpendicular to the longitudinal axis of the corner beam 20 so that a rotation is permitted. It is important that the alignment in the longitudinal axis of the corner beams 20 takes place very exactly. As explained in more detail in the following in connection with FIGS. 11 and 12, the pinning system can be actuated by means of the actuation element 103.

To be able to telescope the telescopic sections 1, 2, a centrally arranged telescopic cylinder 10 is arranged by means of which the telescopic section 2 shown in FIG. 1 can be telescoped out of the telescopic section 1, but can also be retracted again.

Support shells 200 are provided between each surrounding and directly adjacent telescopic section. Since the support shells 200 cause or define the spacing between the telescopic sections, the welded construction of the lattice bars 21 can have a greater cross-section 22 in some regions than at other points 23, with the points 23 in particular being the connections or in the region of the connections to the corner beams 20. The flow of force from the corner beam 20 into the lattice bar 21 is hereby made ideal, that is free of notches.

For cost reasons, however, as a rule, the lattice bar 21 is produced, as known, from a tube having a circular cross-section. Then, however, the available construction space between the adjacent telescopic sections is not ideally used. The tight space conditions can be seen from FIG. 1.

Further embodiments are shown in FIGS. 3 to 7.

Figure 3:
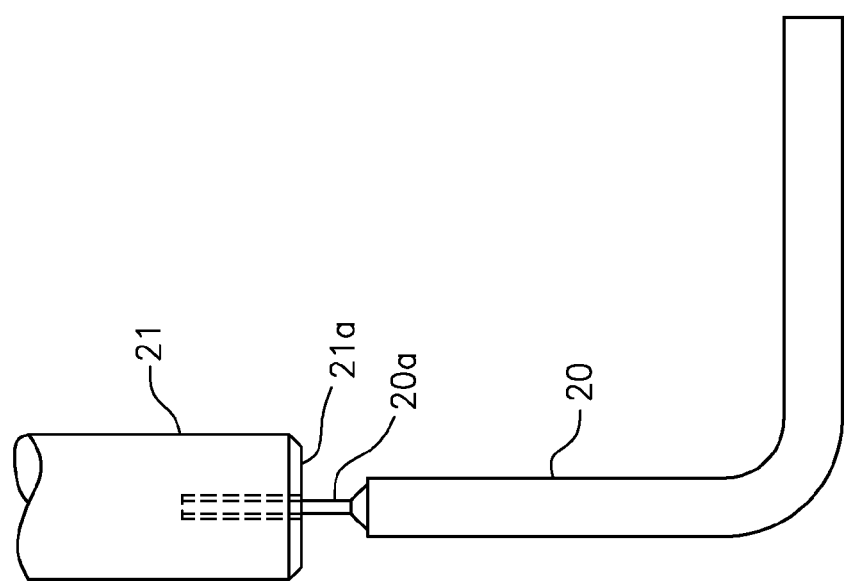
FIG. 3: a schematic representation of a first embodiment of the connection of a corner beam to a lattice bar.
Figure 8:
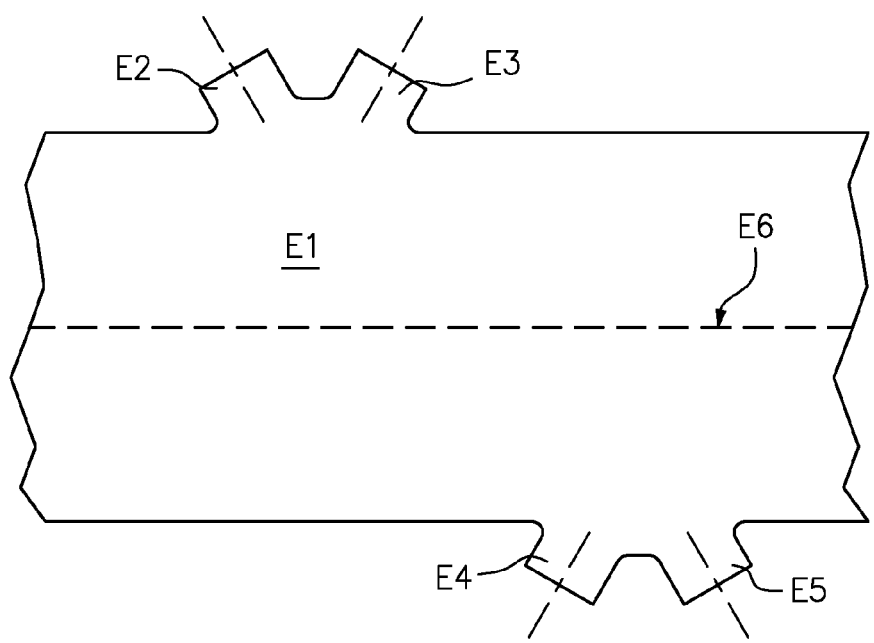
FIG. 8: a schematic representation of a possible embodiment of the corner beam.
Figure 9:
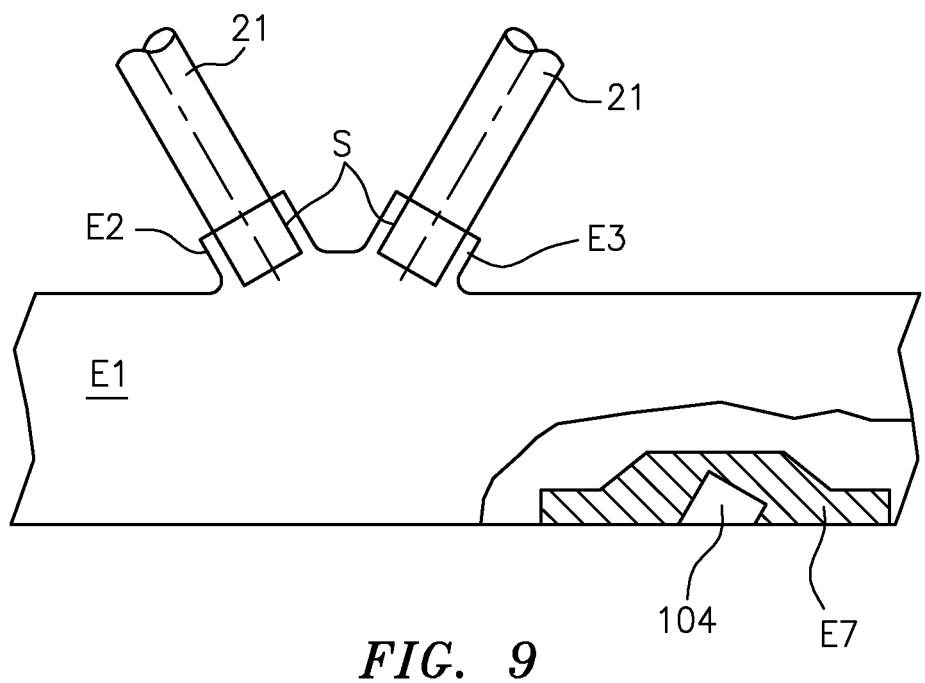
FIG. 9: a further schematic representation of the embodiment of the corner beam shown in FIG. 8.

FIG. 3 shows a possible embodiment of the connection of a corner beam 20 to a lattice bar 21, with the lattice bar 21 being a slit tube. The tube in this respect has a cover plate 21a. The corner beam 20 is a normal, edged metal sheet which does not have any separate connection points, in particular connections E2, E3, E4 and E5, as shown in FIGS. 8 and 9, to save offcuts. For this reason, the connection plates 20a are necessary which are welded to the corner beam 20 and are introduced into a slit of the lattice bar at the end side and are fastened there.

Figure 4:
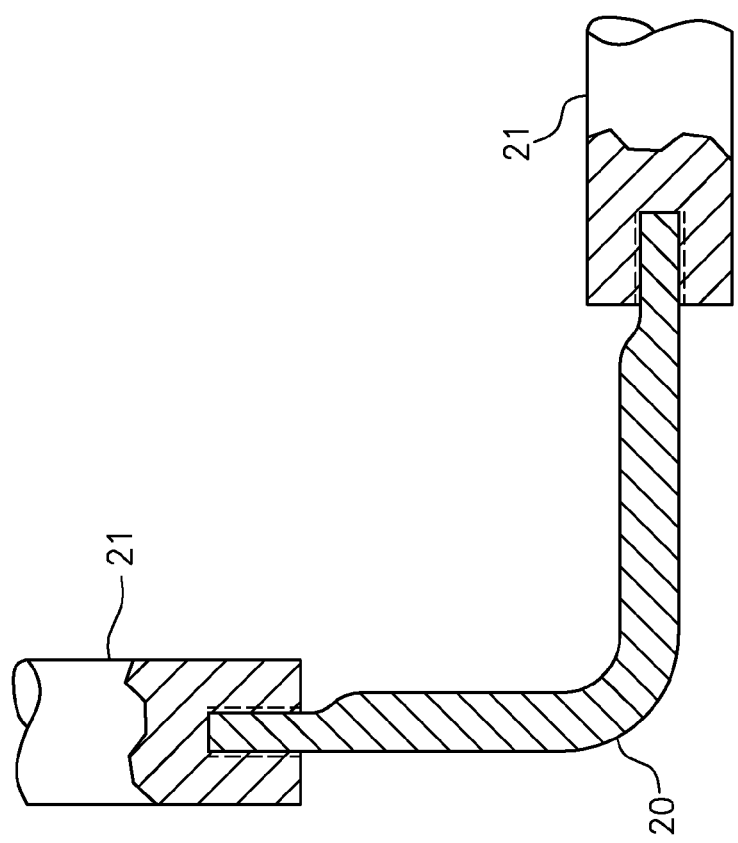
FIG. 4: a schematic representation of a second embodiment of the connection of a corner beam to a lattice bar.

FIG. 4 shows an embodiment which is comparable with the embodiment shown in FIG. 3, with here, however, the corner beam 20 being manufactured from a profiled extruded section. The advantage hereby results that different plate thicknesses can be realized.

Figure 5:
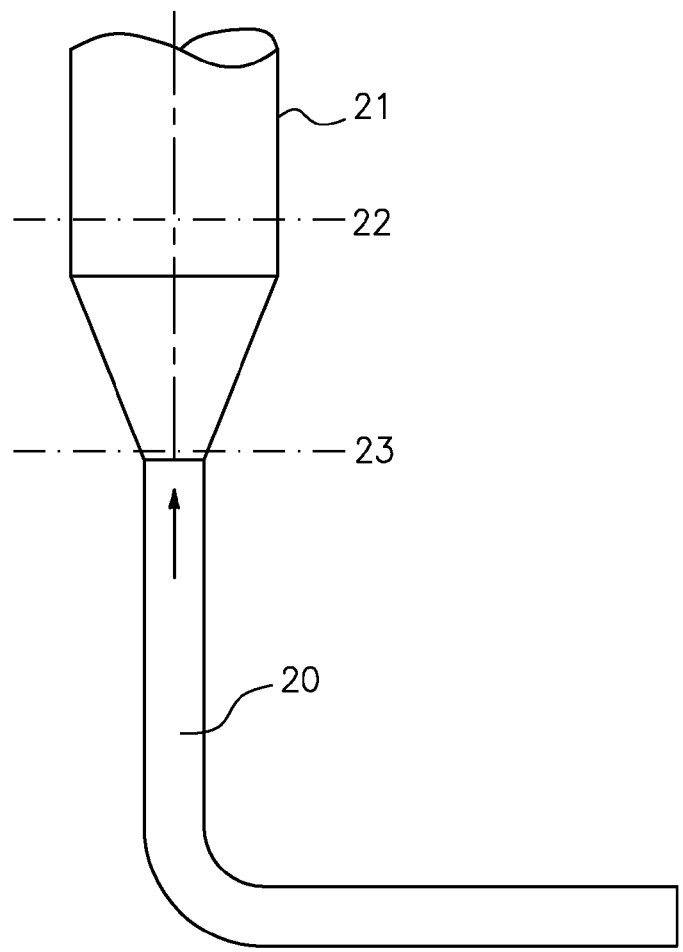
FIG. 5: a schematic representation of a third embodiment of the connection of a corner beam to a lattice bar.
Figure 6:
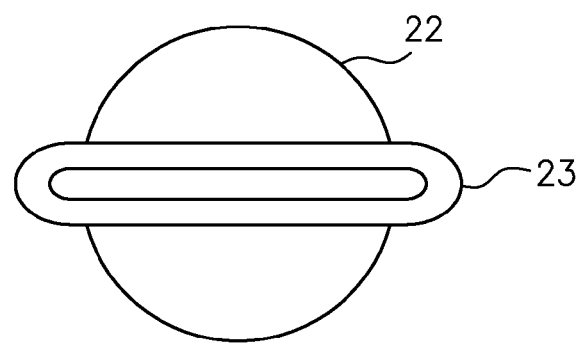
FIG. 6: a schematic detailed representation of the embodiment of the connection of a corner beam to a lattice bar shown in FIG. 5.

The solution shown in FIGS. 5 and 6 is designed such that the connection plate 20a can be dispensed with. Here, the lattice bar 21 is compressed at its end or its ends, as is shown in detail in FIG. 6. A flat cross-section hereby arises to which the corner beam 20 can be directly welded.

Figure 7:
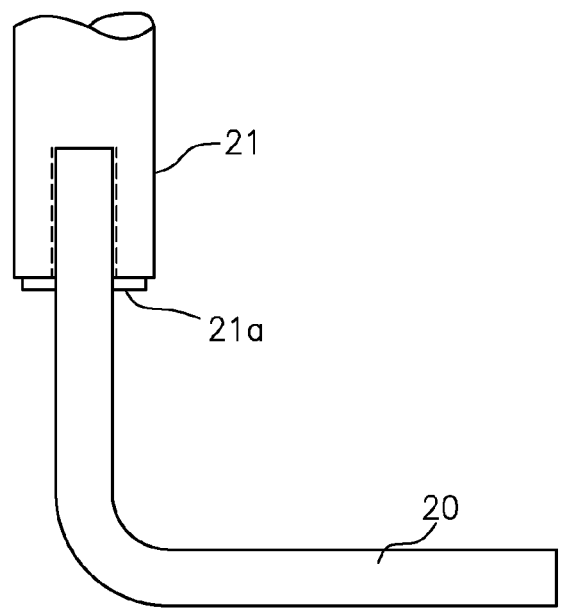
FIG. 7: a schematic representation of a fourth embodiment of the connection of a corner beam to a lattice bar.

FIG. 7 shows a corner beam 20 and a lattice bar 21, with the corner beam 20 being welded directly into the slit lattice bar 21. In this respect, a cover plate 21a is likewise used.

If the corner beam 20 is manufactured from an edged plate E1, as is shown in FIGS. 8 and 9, it can already be provided with the connections E2, E3, E4 and E5 for the lattice bars 21 forming the diagonals and, optionally, the zero bars, on the cutting out of the shape. After the firing, the plate E1 is edged at the intended point E6. After the edging, the connection between the lattice bars 21 and the connections E2, E3, E4 and E5 is established by means of weld seams S.

If it should become necessary that the pinning points 104 or recesses 104 (cf. e.g. FIG. 1) are strengthened, this can also already be taken into account on the firing. A reinforced pinning plate E7 can be used, as is shown in FIG. 9. The pinning plate E7 could also be a cast part.

Figure 10:
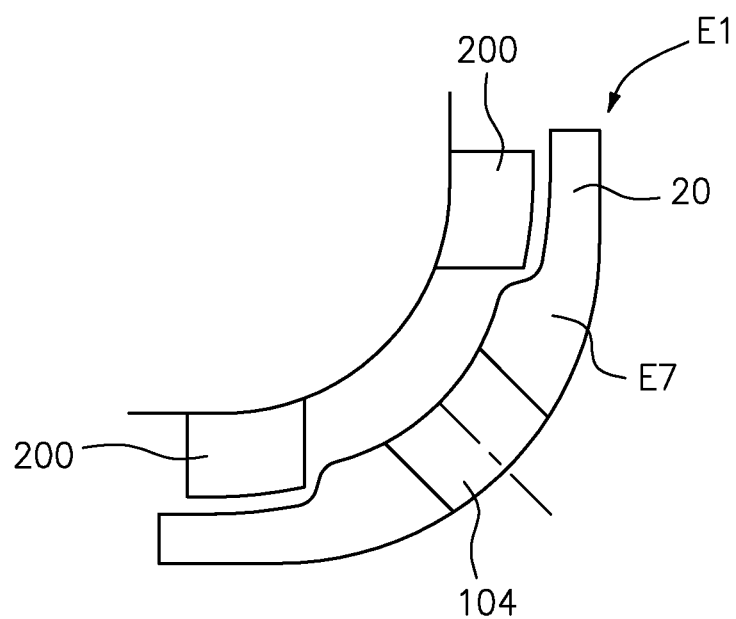
FIG. 10: a further schematic representation of the embodiment of the corner beam shown in FIGS. 8 and 9.

If the reinforcement is present, the support shell 200 has to be removed accordingly for the purpose of assembly or must even comprise two parts, as is shown in FIG. 10.

Figure 11:
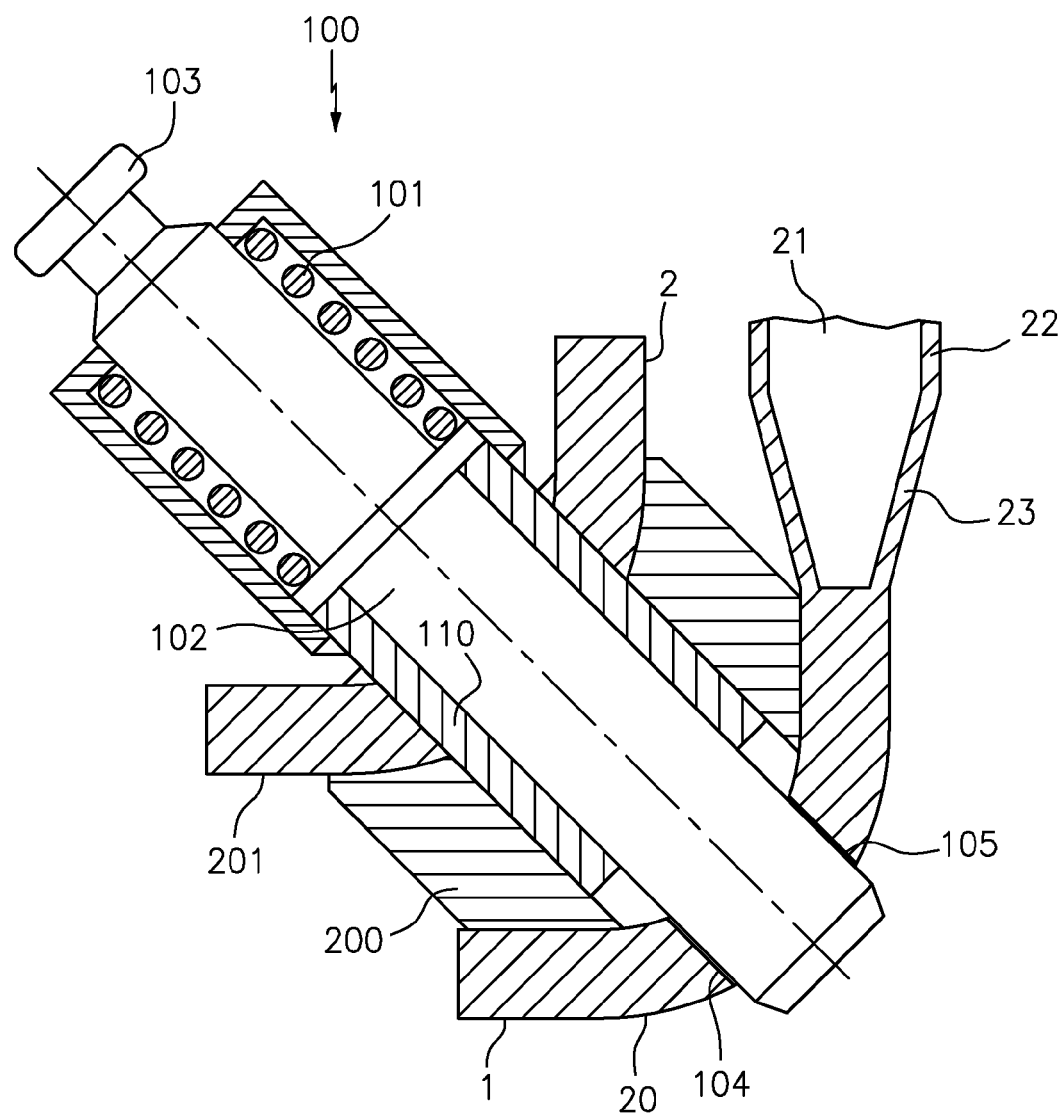
FIG. 11: a schematic detailed representation of a pinning system.

FIG. 11 shows a schematic representation of the pinning system 100. The pinning system 100 has a pin 102 loaded by a spring 101. The pin has an actuation unit 103. A guidance and holding pipe 110 is welded in the inwardly disposed corner beam 20' which can, for example with respect to FIG. 1, be the corner beam 20' of the telescopic section 2.

The guidance and holding tube 110 in this respect substantially takes over two tasks. On the one hand, it positions the support shell 200 and, on the other hand, it positions the pin 102 of the bolting system 100 very exactly. The transmitted forces are forwarded from the guidance and holding tube 110 into the corner piece of the telescopic section 2 and thus into the corner beams 20'. The pin 102 is pulled at the actuation unit 103 and brought out of engagement with the corner beam 20. The telescopic cylinder 10 can now move the inwardly disposed telescopic section and bring it to engagement at another cut-out 104 in the corner beam 20. Provision is now advantageously made that, unlike the prior art, now a plurality of pinning systems 100 are provided, in particular four pinning systems per telescopic section, that is one respective pinning system 100 in each of the corner beams 20 and advantageously per pinning point. One respective pair of telescopic boom elements in this respect preferably has two pinning points, namely a first pinning point for the retracted position and a second pinning point for the extended position.

The pinning systems 100 are preferably aligned in a plane which extends perpendicular to the longitudinal axis of the telescopic section as well as in the angle bisector between limbs of the corner beam 20 with respect to its pin axis alignment.

Figure 12:
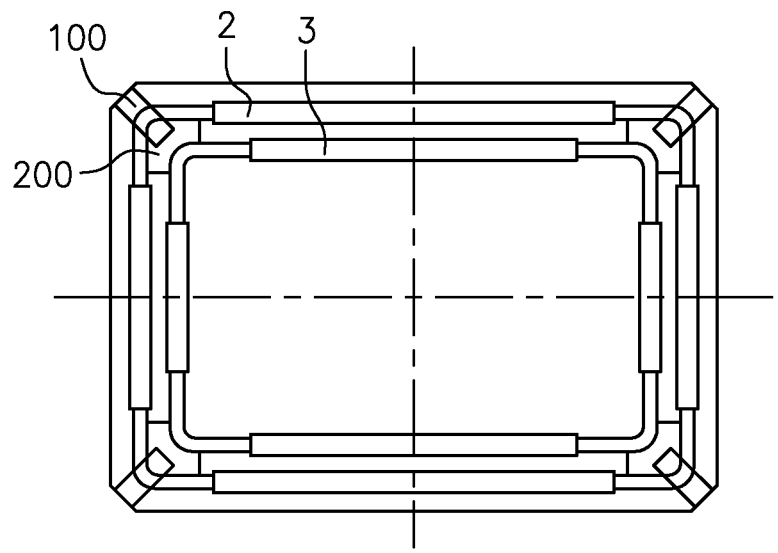
FIG. 12: a schematic front view of the telescopic boom.
Figure 13:
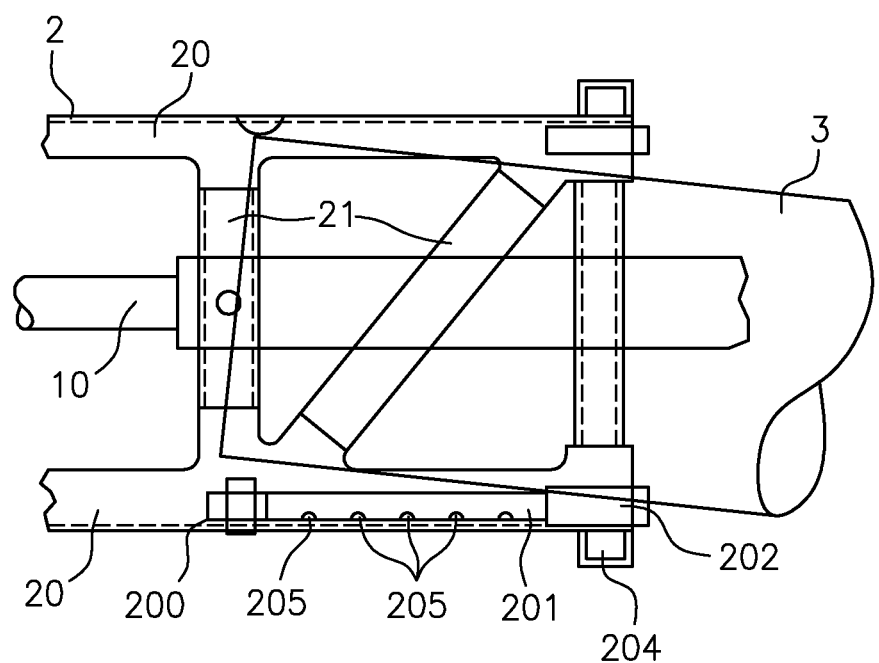
FIG. 13: a schematic side view of the telescopic boom.
Figure 14:
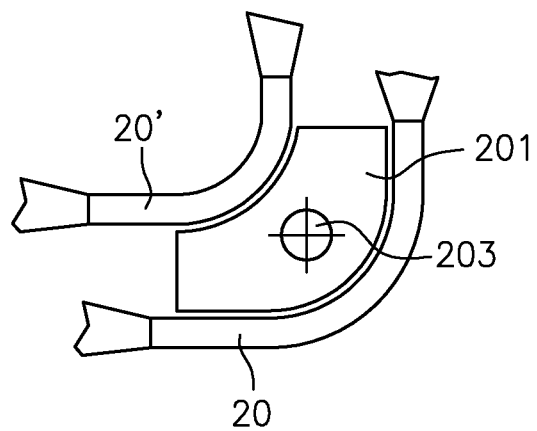
FIG. 14: a schematic detailed representation of the front support point of the telescopic boom.

FIG. 12 shows two telescopic sections in one another, e.g. telescopic sections 2 and 3. As is further shown in FIG. 13, the telescopic cylinder 10 is connected to the telescopic section 3 and pushes it out after the release of the connection points to the surrounding telescopic section 2. The spacing from the front support point 202 and the rear support point 200 hereby becomes smaller and the support clearance causes the telescopic section 3 to tilt further down. The support shells 200 serving as rear support points 200 have already been described above in more detail. The rear support point 200 is furthermore connected to a spacer 201. For stability purposes, the spacer 201 can have a steel core 203 as is shown in FIG. 14.

Figure 15:
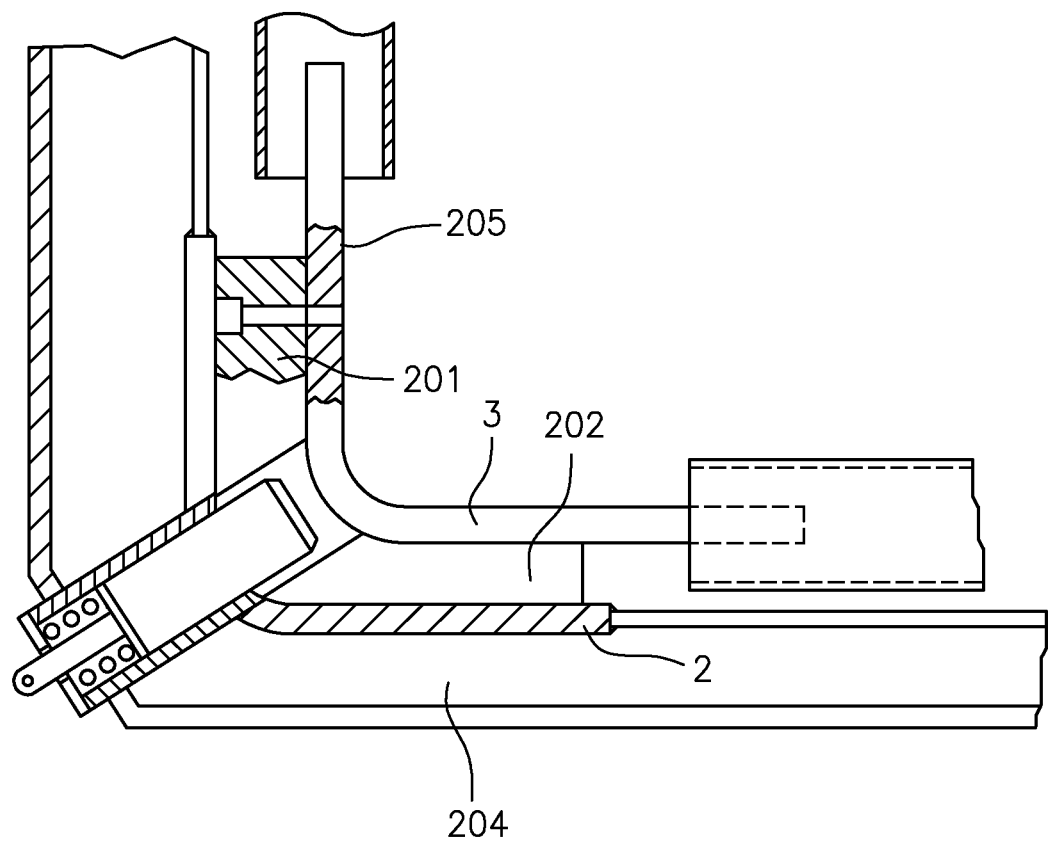
FIG. 15: a schematic sectional representation through the front support point of the telescopic boom.

FIG. 15 shows the connection of the support point to the corner beams in different sections. The pin 204 closed by the compression spring serves as an abutment and holds the support shell 202 in position. It further shows a cut-free spacer with a guide screw. The hydraulically openable pin 204 is necessary so that the inner telescopic section can be removed.

Additional holding apparatus 205, such as guide screws 205 in accordance with FIG. 15, can be provided. For this purpose, guide screws are used which primarily hold the spacers 201 in position, but do not lead off the force arising on the alignment of the telescopic sections into the corner beams 20.

The front support point 202 is connected to the surrounding telescopic section 2. The connection can take place via the stable abutment bolt 204. It takes up the forces in the pushing-out direction of the telescopic sections.

Figure 16:
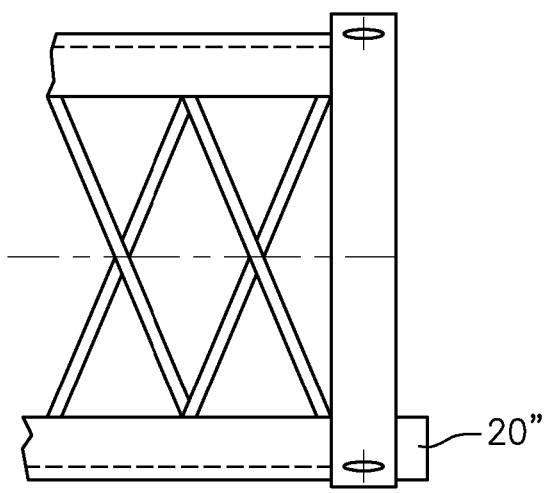
FIG. 16: a schematic side view of a further embodiment of the telescopic boom.

As shown in FIG. 16, the lower corner beams 20" can be drawn slightly forward. The setting on and positioning of the next corner beam is thus simplified on the installation of the telescopic boom.

Figure 17:
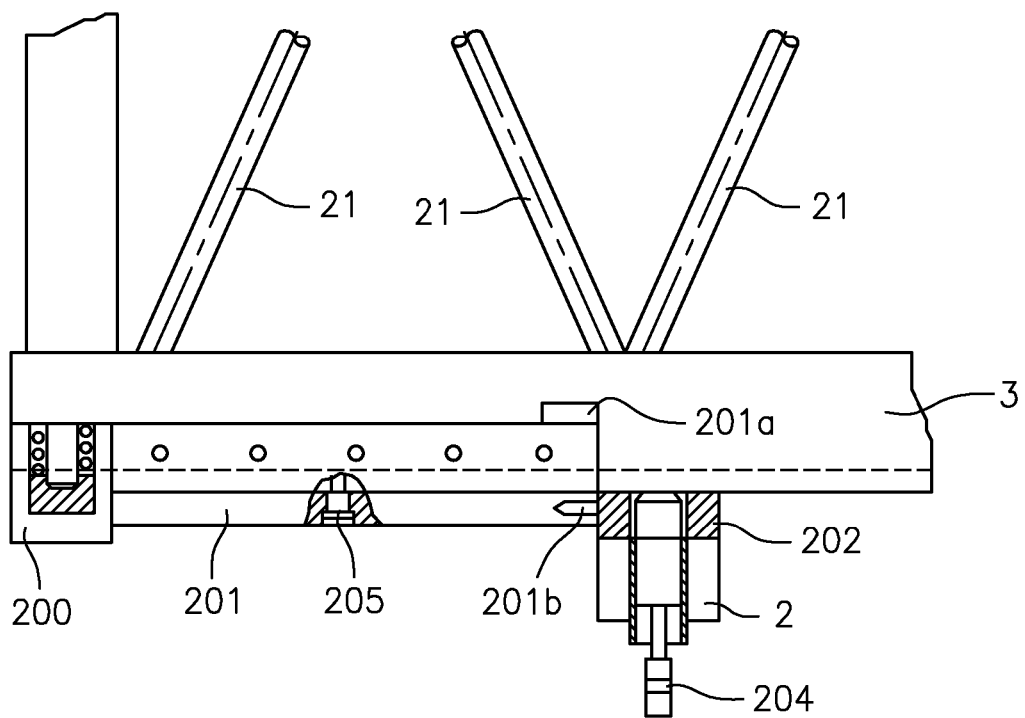
FIG. 17: a schematic side view of a further embodiment of the telescopic boom.
Figure 18:
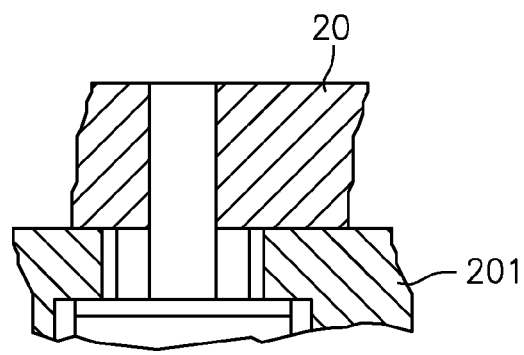
FIG. 18: a schematic detailed view of the embodiment of the telescopic boom in accordance with FIG. 17.

In addition, it can be helpful and of advantage to use further apparatus for the exact positioning. As can be seen from FIG. 17, such apparatus can, for example, be an abutment 201a which brings the spacer 201 into a defined position, that is positions the spacer 201 in a compulsory manner, on the reaching of the end position. Furthermore, centering spigots 201b can be provided which lead the front support point 202 with the spacer 201 into a defined position. FIG. 18 shows a further detail view of this. The force transmission from the means for the compulsory positioning to the inner telescopic section 3 must be ensured since hereby the exact positioning of the pinning points to one another takes place.

Figure 19:
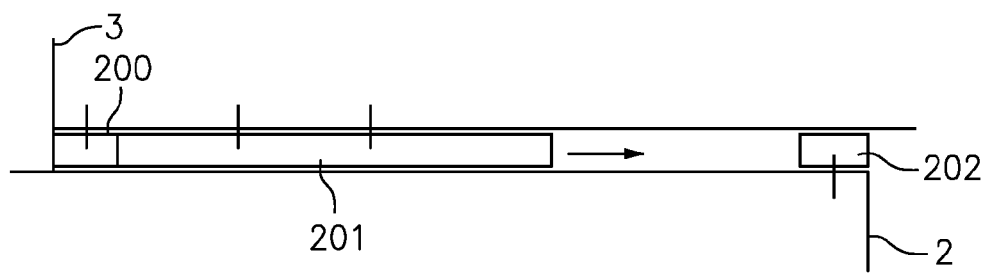
FIG. 19: a first schematic diagram of the pushing-out process of the telescopic boom.
Figure 20:
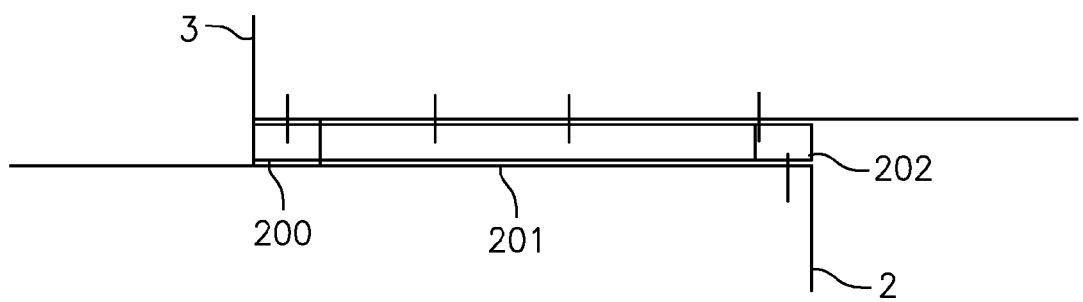
FIG. 20: a second schematic diagram of the pushing-out process of the telescopic boom.

FIGS. 19 and 20 show a more detailed illustration of the pushing-out process of the telescopic section 3 from the telescopic section 2. At the start of the pushing-out process, the support shell 200 of the telescopic section 3 pushes the spacer 201 in the direction of the front support point 202. At the end of the pushing-out process, the spacer 201 is pressed toward the front support point 202.

Figure 21:
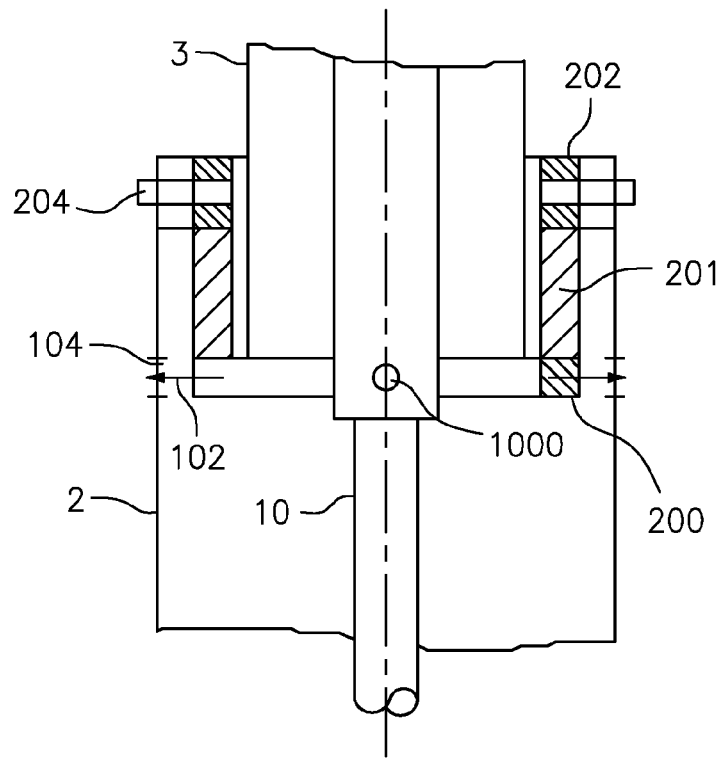
FIG. 21: a third schematic diagram of the pushing-out process of the telescopic boom.
Figure 22:
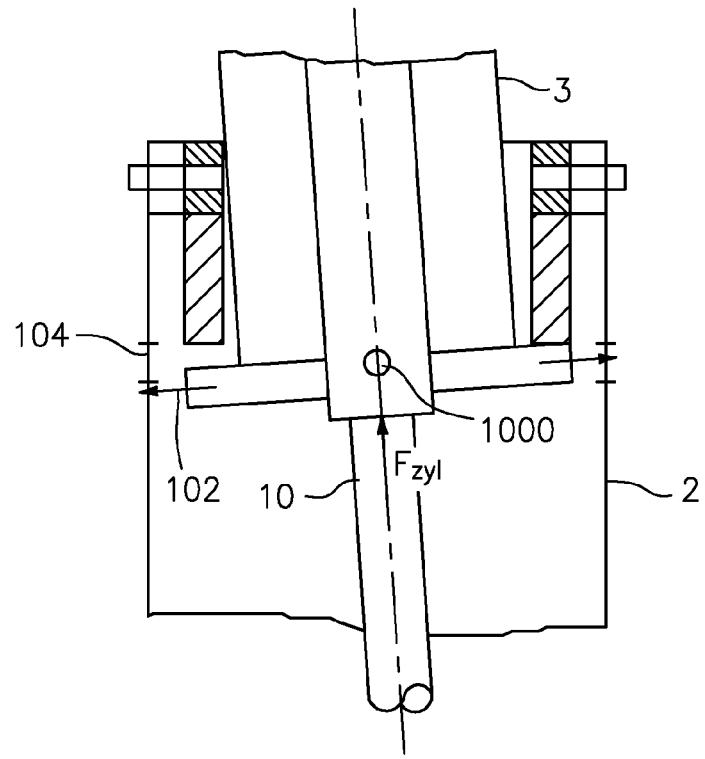
FIG. 22: a fourth schematic diagram of the pushing-out process of the telescopic boom.

As shown again in detail in FIGS. 21 and 22, the telescopic cylinder 10 pushes the telescopic section 3 out beyond the connection point 1000. The telescopic section 3 is laterally supported at the front support points 202 and at the rear support points 200. The longitudinal axis of the telescopic section 3 will tilt toward the longitudinal axis of the telescopic section 2 via the clearance in the support points. Consequently, the pins 102 of the pinning system 100 cannot be paired with the cut-outs 104 of the telescopic sections. If the rear support point 200 abuts the front support point 202 via the spacer 201, the force $F_{zyl}$ increases in the telescopic cylinder 10. The latter effects a torque about the connection which was first effected between the rear support point 200 via the spacer 201 and the front support point 202 and brings the other pinning points into position. It thereby becomes possible to pair the pins 102 to the recesses 104. It must be noted that disturbance variables such as wind forces $F_{Wind}$ have to be overcome (cf. FIG. 23).

No connection analog to a telescopic boom is established by the tight tolerances of the cut-outs 104 to the pins 102, but rather a connection analog to a lattice boom, that is a stable pressure bar is created as a boom.

The boom can be set or is set steep to relieve all support points. Erection angles of greater than 80° to the horizontal are provided here. A further criterion is the torque compensation on telescoping. FIG. 23 shows the conditions here. If the telescopic lattice boom is telescoped, two substantial variables act on the boom, namely the weight of the load and/or hook block $F_K$ having the spacing a1 and the tensile force $F_T$ of the adjustment block with the plurality of shearing strands which all have to be removed from the winch with the spacing a2. The luffing angle $\alpha$ is selected so that both resulting torques approximately compensate one another. The support points are also hereby relieved.

Figure 25:
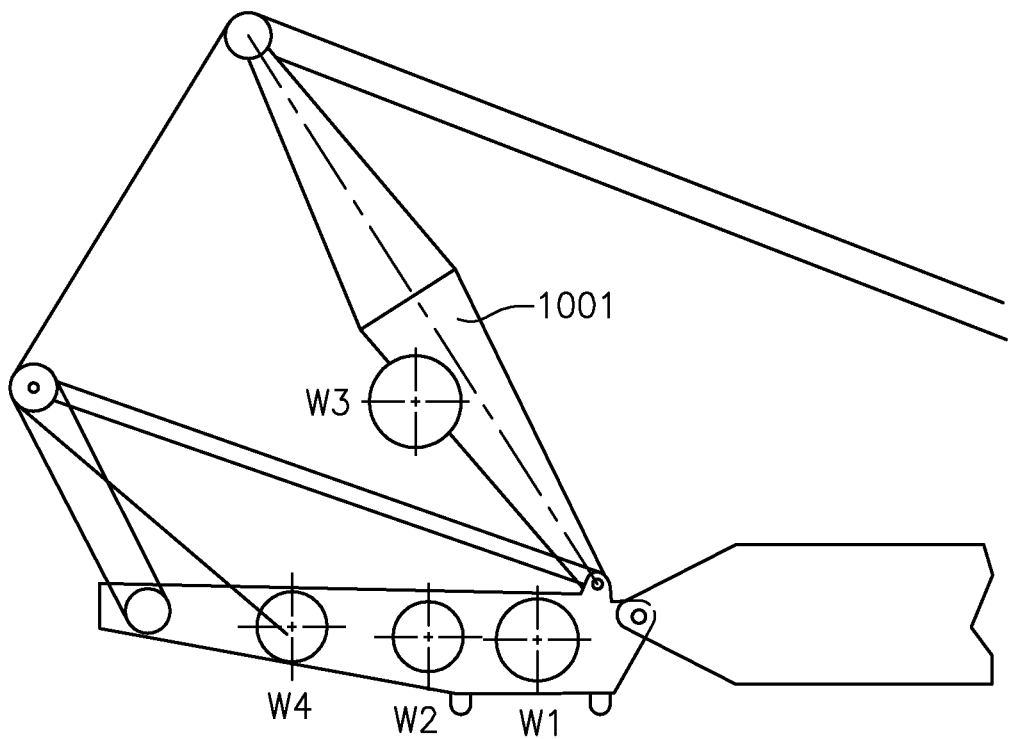
FIG. 25: a schematic representation of a derrick boom.
Figure 26:
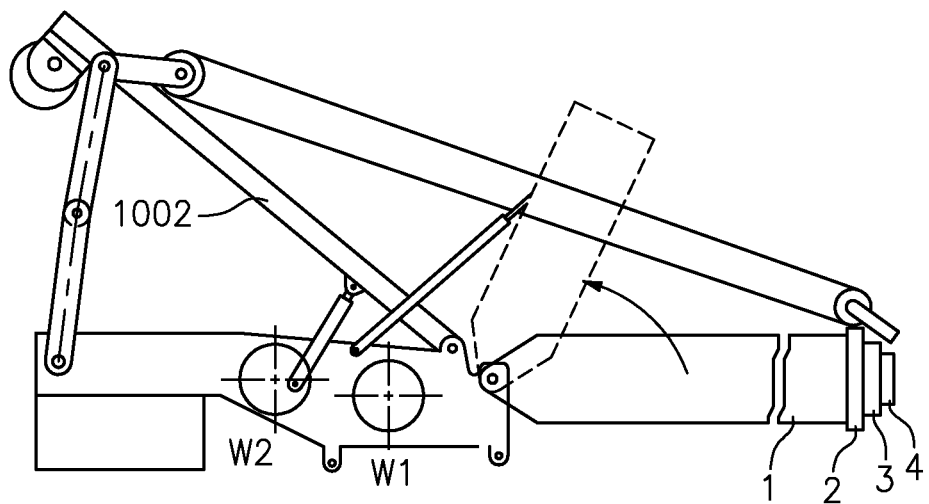
FIG. 26: a schematic representation of the telescopic boom.

In addition to the fast establishing of the work capability, the small transport volume to the construction site must be emphasized as a special advantage. A great benefit of the derrick boom 1001 is the better angle on the erection of the boom which can be telescoped in, see FIG. 25. The arrangement of the winches W1, W2, W3 and W4 is likewise drawn here. In FIG. 26, the erection of a telescopic boom in accordance with the invention is shown comprising a pivotal connection piece 1 and the telescopic sections 2, 3, 4. Since the boom is erected in the stated telescoped inwardly, no derrick boom is required. A guying frame 1002 is sufficient. If the telescopic boom is erected, the telescoping of the respective telescopic sections starts in a known manner. In this respect, the luffing rope arrangement is naturally synchronously paid out in order not substantially to change the luffing angle of the telescopic boom. This will be explained in more detail by way of example with reference to FIGS. 27 and 28.

Figure 27:
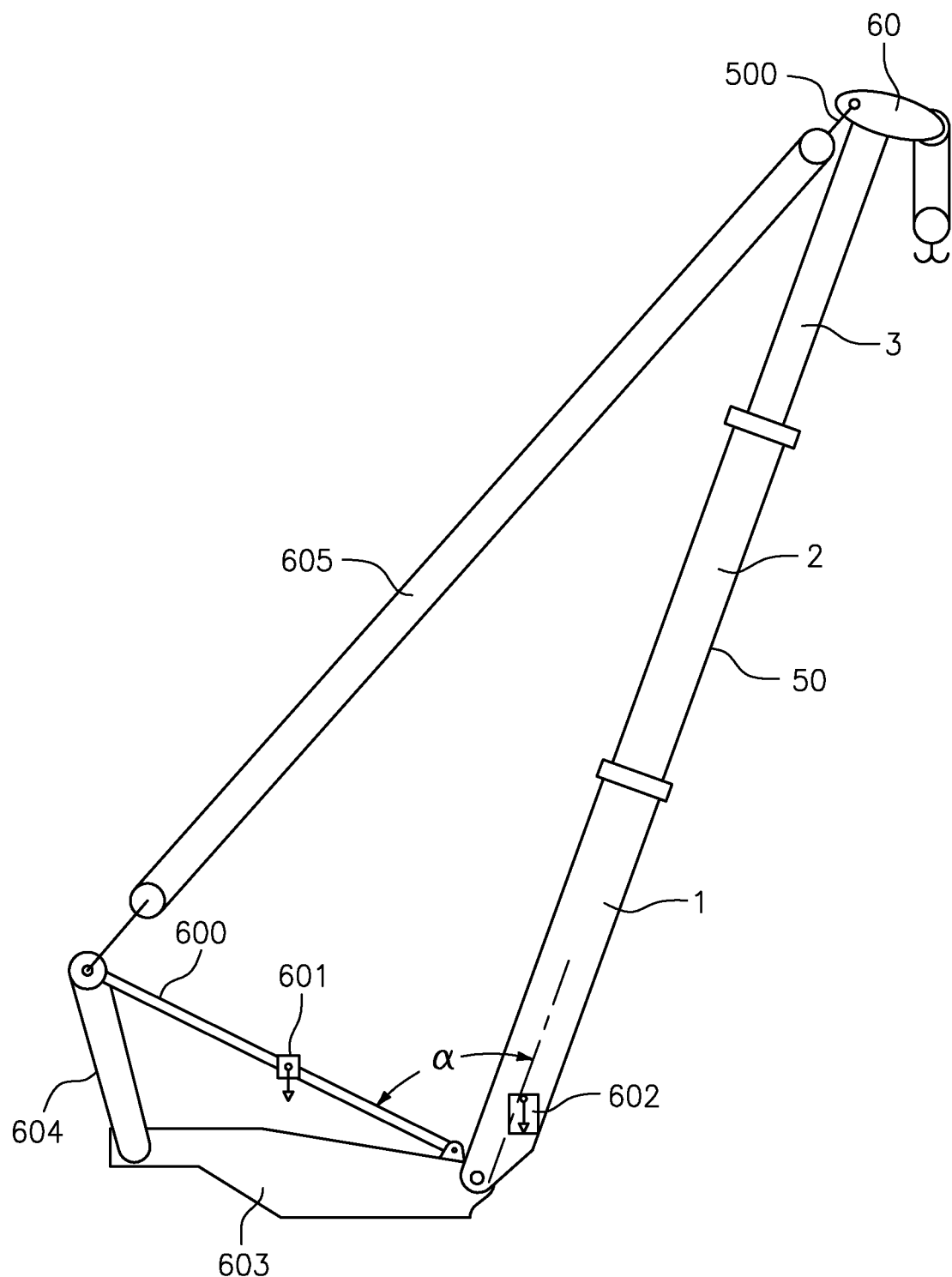
FIG. 27: a further schematic representation of the telescopic boom.

FIG. 27 represents the angle conditions at the extended telescopic boom. The main boom 50 is connected to the length-variable rope arrangement 605 via the stay poles 500, with the main luffing body 60 of the main boom 50 being shown at the tip of the main boom having the reference numeral 60. The length-variable rope arrangement 605 is in turn connected to the guying frame 600. The guying frame 600 is connected via the luffing rope arrangement 604 to the superstructure 603. The guying frame 600 and the main boom 50 each have an angular encoder 601, 602.

The angle α is predefined for an ideal function (due to the geometric conditions) and has to be monitored from a technical control aspect. For this purpose, the two angular encoders 601, 602 deliver the data to the control. On the telescoping of the main boom inwardly and outwardly, the length-variable rope arrangement 604 is correspondingly adjusted. The aim is that the angle α is maintained in the range from approximately 80° to max. 90°. It can be recognized from FIG. 27 that an angle of 90° cannot be reached with a steep-set main boom 50. After the telescoping, the length-variable rope arrangement 605 is no longer used.

The luffing of the main boom 50 takes place via the luffing rope arrangement 604.

Figure 28:
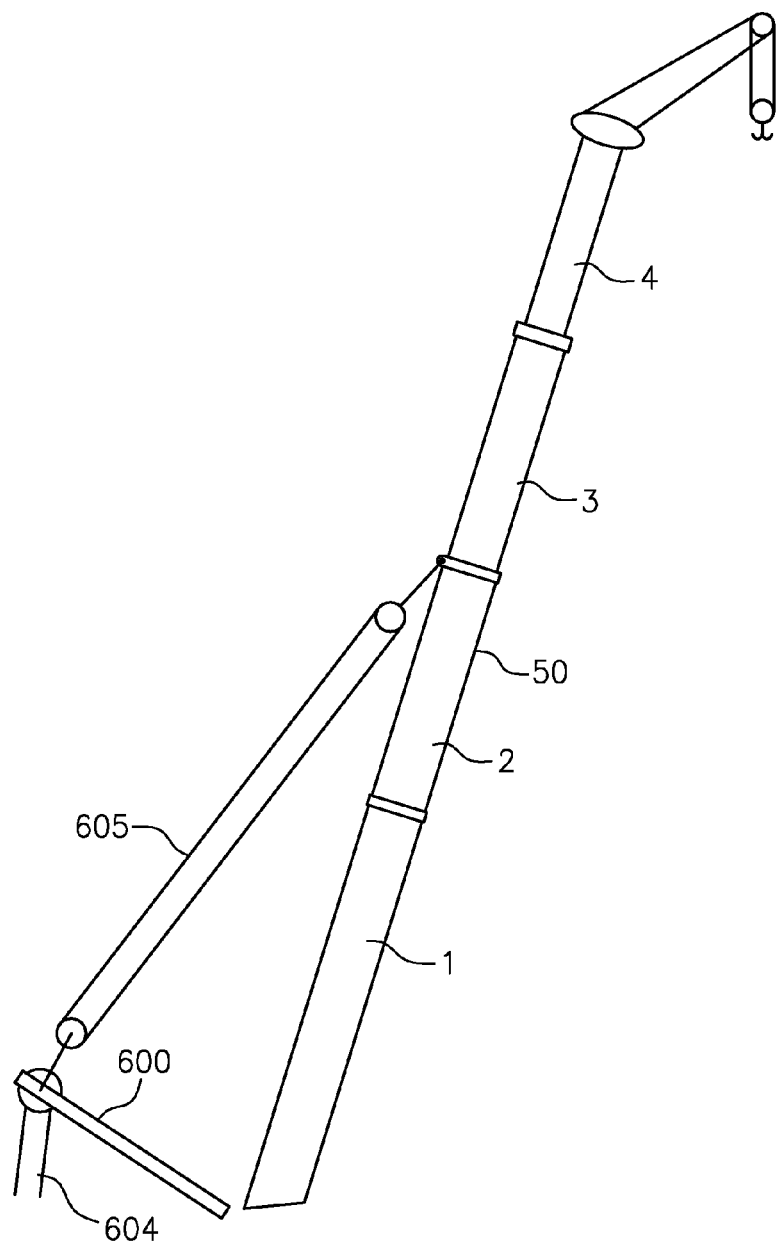
FIG. 28: a further schematic representation of the telescopic boom.

It can furthermore be advantageous if the guying, that is the length-variable rope arrangement 605 in the upper example, does not take place at the outer end of the main boom 50, but rather at the collar of the inner telescopic section, e.g. at the collar of the telescopic section 2 as shown in FIG. 28. The upper telescopic sections are hereby subject to the bending stress usual for normal telescopic booms, while the inner telescopic sections are loaded analog to a normal lattice crane.

It remains to be mentioned that the telescopic beam in accordance with the invention is not provided for operation with a luffing ram. It is always operated with a guying frame or a derrick boom and a luffing rope arrangement.

Since the crane in accordance with the invention is a crane for the installation of wind power plants, it can operated in modular form for this purpose with little transport volume and transport weight. This becomes apparent when one considers that large lifting heights, but only very small radii are required for the installation of wind power plants. Relatively little ballast is thus required for the crane work. The large amount of ballast is required due to the erection of the long (lattice) boom. This is avoided here; neither a derrick boom nor the large amount of ballast thus has to be transported to the construction site. The number of the winches which are transported to the construction site could also be reduced, which further reduces the transport volume and the transport weight. If the crane is used for other purposes, a known crane construction can take place, as described in FIG. 25.

A further advantage is the small space requirements on the erecting of the boom. Only little space to set up the long lattice booms is frequently available on hilltops or on the installation of wind power plants in forest regions. A boom having a length of well over 150 m can thus only be installed on the ground with difficulty, if at all.

It is a very simple and robust construction with respect to conventional telescopic booms with a guying system.

Figure 29:
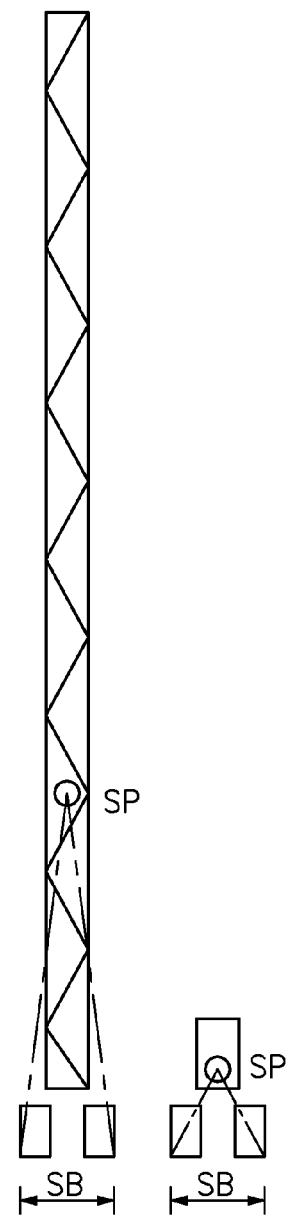
FIG. 29: a schematic representation of the centers of gravity of a lattice crane and of a telescopic lattice crane in accordance with the invention.

The center of gravity SP of a lattice crane is drawn in FIG. 29 which is a lot higher in comparison with the center of gravity SP' of the telescopic boom in accordance with the invention which can be telescoped inwardly. It can clearly be seen that the telescopic boom in accordance with the invention provides improved security against tipping over with a comparable support width SB.

The invention claimed is:

1. A telescopic boom comprising:
at least first and second concentrically-positioned boom elements (1-4) together defining a longitudinal axis of the telescopic boom,
each said boom element (1-4) having a substantially quadrangular box-shaped hollow structure formed by four corner beams (20) respectively having four bent corner edges,
each said corner edge having a cutout (104) at the respective corner thereof,
four lattice bars (21), each said lattice bar (21) intercoupling two adjacent corner beams (20),
a pinning system (100) for coupling concentric telescopic sections (1-4) together upon full extension, and comprising
a plurality of shells (200), each said shell (200) interposed between two adjacent concentric telescopic sections (1-4) adjacent said corner beams and affixed to an inner concentric telescopic section of two adjacent concentric telescopic sections,
a plurality of spacers (201), each said spacer (201) affixed to an adjacent shell (200) in the direction of the longitudinal axis of the telescopic boom,
a front support point (202) affixed to an outer concentric telescopic section of two adjacent concentric telescopic sections, and with one of said plurality of shells (200) forming a rear support point,
said front and rear support points (202, 200) each having an elongate hole (105) therethrough,
spring-loaded (101) pins (102) arranged to couple adjacent concentric telescopic sections together, and
a telescopic cylinder (10) arranged to telescopically extend the inner concentric telescopic section (1-4) and which is pivotally mounted about a laterally-extending axis normal to the longitudinal axis of the telescopic boom,
with one of said spacers (201) longitudinally spaced away from the adjacent front support (202) in unextended position and abutting said adjacent front support (202) in fully extended position.

2. The telescopic boom in accordance with claim 1, comprising a spring which is a restoring spring and an actuation unit arranged to retract the spring to release the pin connection, with the actuation unit further being arranged in an interior of the first boom element and the pin being retractable to said interior or the pin being able to be pushed outwardly with respect to the first boom element.

3. The telescopic boom in accordance with claim 1, wherein the pinning system is arranged in at least three corner beams and at least one respective pin guide is provided in a first position and in at least one second position, with the first position corresponding to a retracted position and the second position corresponding to an extended position.

4. The telescopic boom in accordance with claim 1, comprising means for exact positioning of the first and second boom elements by which the first and second boom elements are indirectly or directly positioned relative to each other, with the means having an abutment by which the positioning spacer is positioned in a compulsory manner in a predefined position on reaching an end position, and having at least one centering spigot by which the front or first support point in a respective one of the first and second boom elements is in a predefined position in a compulsory manner with the positioning spacer.

5. The telescopic boom assembly in accordance with claim 1, wherein the pin is spring biased to the engagement position and movable against the biasing force of the spring to the release position, and the pin guide includes an actuation member associated with the pin for movement of the pin, the actuation member being arranged in the interior of one of the boom elements and movable inwardly with respect to the one boom element to the release position.

6. The telescopic boom assembly in accordance with claim 1, wherein the pin is spring biased to the engagement position and movable against the biasing force of the spring to the release position, and the pin guide includes an actuation member associated with the pin for movement of the pin, the pin being movable inwardly with respect to the respective boom element to the release position.

7. A mobile crane having a telescopic boom in accordance with claim 1.

8. The telescopic boom in accordance with claim 1, wherein the spring-loaded (101) pins (102) are each arranged to extend through a guide tube (110) and into a respective cutout (104) through the elongate hole (105).

9. The telescopic boom in accordance with claim 1, wherein the shells (200), spacers (201) and front support points (202) are each L-shaped.

10. The telescopic boom in accordance with claim 1, wherein each said corner beam (20) being a profiled, extruded section.

11. The telescopic boom in accordance with claim 1, wherein said lattice bars (21) are each compressed at opposite ends thereof and directly welded to adjacent corner beams (20).

12. The telescopic boom in accordance with claim 1, additionally comprising an abutment (201a) positioned opposite one longitudinally-extending side of said spacer (201) for guiding said spacer (201) into a defined end position and a centering spigot (201b) positioned to extend toward said spacer (201) from said front support point (202).

13. The telescopic boom in accordance with claim 1, wherein the first and second boom elements each have L-shaped corner beams forming the corner edges of the box-shaped structure and lattice bars connecting the corner beams, and wherein the spacer member has a lateral L-shaped cross-section.

14. The telescopic boom in accordance with claim 13, wherein an axis of the pin of the pinning system is aligned and/or arranged substantially along the angle bisector between limbs of the corner beams and further is arranged in a plane perpendicular to the longitudinal axis of the telescopic boom; and comprising a guide tube or a holding tube inserted into a respective one of the corner beams and with the pin of the pinning system guided therein.

15. The telescopic boom of claim 13 wherein the lattice bars are connected to the corner beams by welding a flat end of each corner beam to a flat cross sectional surface at the end of a respective lattice bar.

16. The telescopic boom in accordance with claim 1, wherein each said lattice bar (21) is a slit tube having slits at opposite ends through respective corner plates (21a), and said corner beams (20) each comprise connection plates (20a) at opposite ends thereof and arranged to seat in respective slits in said adjacent lattice bars (21).

17. The telescopic boom in accordance with claim 16, wherein said corner beams (20) are directly welded to said adjacent lattice bars (21).

\* \* \* \* \*